Figures 1, 2, 3:
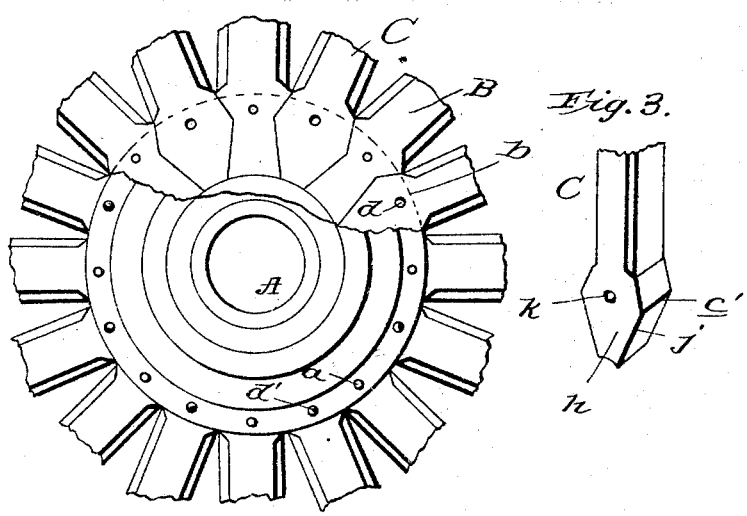

(No Model.)

J. G. ROSEBOOM.
VEHICLE WHEEL.

No. 503,554. Patented Aug. 15, 1893.

Witnesses:

Inventor,
Jesse. G. Roseboom.
By James J Sheehy
Attorney

UNITED STATES PATENT OFFICE.

JESSE GARRETSON ROSEBOOM, OF CINCINNATI, OHIO.

VEHICLE-WHEEL.

SPECIFICATION forming part of Letters Patent No. 503,554, dated August 15, 1893.

Application filed February 10, 1890. Serial No. 339,936. (No model.)

*To all whom it may concern:*

Be it known that I, JESSE GARRETSON ROSEBOOM, a citizen of the United States, residing at Cincinnati, in the county of Hamilton and State of Ohio, have invented certain new and useful Improvements in Vehicle-Wheels; and I do declare the following to be a full, clear, and exact description of the invention, such as will enable others skilled in the art to which it appertains to make and use the same.

My invention relates to improvements in vehicle wheels and more particularly to the spokes thereof, and it has for its general object to provide a vehicle wheel embodying spokes so constructed and arranged in a hub that when the quota of spokes is complete they will serve materially to prevent the withdrawal or displacement of any one spoke in a radial direction.

Other objects and advantages of the invention will be fully understood from the following description and claims when taken in conjunction with the accompanying drawings, in which—

Figure 1, is an elevation, with parts broken away of a wheel hub, my improved spokes being shown in position therein. Fig. 2, is a detail perspective view illustrating one of the forms of spokes, and Fig. 3, is a similar view of the other form of spokes which are arranged alternately with respect to the spokes of the form illustrated in Fig. 2.

Referring by letter to said drawings: A, indicates a wheel hub which is preferably formed from metal and preferably comprises two plates *a, b*, as shown. These plates *a, b*, which are designed to receive my improved spokes B, C, between them as illustrated, are provided at suitable points adjacent to their peripheries with transversely disposed apertures *d*, for the passage of bolts *d'*, through the medium of which the spokes are preferably connected to the hub as will be presently described.

The spokes B, which are arranged alternately with respect to the spokes C, as shown, are provided in their transverse sides, at their inner ends with recesses *e*, the walls of which describe obtuse angles as illustrated, so as to form the shoulders *f*, and the dovetail tongue *g*, which are for a purpose presently set forth.

The spokes C, as better illustrated in Fig. 3, are provided at their inner ends with enlargements *h*, the transverse sides of which describe obtuse angles similar to the walls of the recesses *e*, of the spokes B, so as to form the shoulders *i*, adapted to engage the shoulders *f*, of the said recesses, and the downwardly and inwardly inclined sides *j*, adapted to rest against the sides of the dovetail tongue *g*.

By the provision of the spokes formed as described, and arranging the same alternately in a hub as illustrated in Fig. 1, it will be readily perceived that they will serve mutually to lock each other in position and prevent any one spoke from being withdrawn or displaced in a radial direction which is an important desideratum, as is obvious.

Both the spokes B, and the spokes C, have their inner ends concaved as shown so as to conform to the box of the hub; and the spokes C, are provided with apertures *k*, for the passage of the bolts *d'*, through the medium of which they are connected to the hub.

I prefer in practice to pass the bolts *d'*, through the spokes C, alone, as I find it unnecessary to connect the spokes B, directly to the hub, but it is obvious that if desired, connecting bolts might be passed through all of the spokes so as to connect same and the hub. It is also obvious that any suitable means other than the bolts *d'*, might be employed for connecting the plates of the hub so as to clamp and hold the spokes, and in some cases I prefer to employ the connecting devices disclosed in my contemporary application filed September 17, 1890, Serial No. 365,311.

It will be readily seen from the foregoing description that while the spokes B, C, arranged as described, are securely locked against withdrawal or displacement in a radial direction, yet any one of the spokes may be conveniently removed, when one of the hub plates is removed, by simply moving it laterally or out of the vertical plane of the other spokes. Thus a damaged spoke may be quickly and conveniently removed and a new spoke placed in position without affecting the other spokes.

Having described my invention, what I claim is—

1. In a vehicle wheel, the combination with a hub, of the spokes B, C, arranged alternately with respect to each other; the spokes B, being provided in their transverse sides at or adjacent to their inner ends with recesses, and the spokes C, having enlargements upon their transverse sides adapted to rest in the recesses of the spokes B, whereby said spokes B, C, will serve mutually to prevent the withdrawal or displacement of each other in a radial direction, substantially as specified.

2. In a vehicle wheel, the combination with a hub comprising two clamping plates and a suitable means for connecting said plates together, of the spokes B, C, placed between the plates of the hub and arranged alternately with respect to each other, the spokes B, being provided in their transverse sides, at or adjacent to their inner ends with recesses and the spokes C, having enlargements upon their transverse sides adapted to rest in the recesses of the spokes B, substantially as and for the purpose set forth.

3. In a vehicle wheel, the combination of a hub, the spokes B, having recesses in their transverse sides, so cut as to form the shoulders $f$, and the spokes C, arranged alternately with respect to the spokes B, and having enlargements upon their transverse sides; the said enlargements forming shoulders adapted to engage the shoulders $f$, of the spokes B, all substantially as and for the purpose set forth.

JESSE GARRETSON ROSEBOOM.

Witnesses:
JEREMIAH GRUMBINE,
GEORGE WILSON BICKETT.